June 18, 1957  F. D. BRADDON ET AL  2,796,576
MANEUVERABLE AUTOMATIC PILOT FOR SHIPS
Filed Jan. 7, 1953  2 Sheets-Sheet 1

INVENTORS
FREDERICK D. BRADDON
FRANCIS WEST, JR.
BY
ATTORNEY.

INVENTORS
FREDERICK D. BRADDON
FRANCIS WEST, JR.
BY
Herbert H. Thompson
their ATTORNEY.

United States Patent Office 2,796,576
Patented June 18, 1957

2,796,576

MANEUVERABLE AUTOMATIC PILOT FOR SHIPS

Frederick D. Braddon, Babylon, and Francis West, Jr., Westbury, N. Y., assignors to Sperry Rand Corporation, a corporation of Delaware Application January 7, 1953, Serial No. 330,112

20 Claims. (Cl. 318—489)

This invention relates to a simplified automatic steering device for ships especially designed for use on tow boats and tugs used in river and inland waterway navigation and adapted for use with radar scopes in fog.

The problem of navigating in rivers and inland waterways is quite different from navigation at sea, because in the former case the primary objective is to keep the craft in the channel away from the banks of the river, and to avoid other obstacles, which are usually present in rivers and harbors. This problem becomes doubly difficult in foggy weather, especially in low lying morning fogs in which the light is intense, but visibility restricted to a few feet at water level. Radar has come to the aid of the navigator in such cases, but presents the difficulty that to steer by his P. P. I. radar scope, the pilot must keep his head under the hood of the scope to shut out the daylight glare. Also the information furnished by the P. P. I. scope is not sufficiently accurate or clear for the pilot to rely solely upon that information in river navigation.

One object of our invention, therefore, is to adapt an automatic pilot so that it may be adjusted by "feel" without the pilot having to actually remove his head from the hood of the scope to observe the steering stand, since if he does so, he is momentarily blinded by the bright daylight and cannot even see the compass. Then again, when he again puts his head under the hood, after having become accustomed to the light in the pilot house, he cannot see the radar screen until his eyes readjust themselves to the darkness. By our invention, therefore, we have redesigned the gyro pilot steering stand so that the helmsman may operate the same entirely by "feel" without having to look at his compass or steering stand. To this end, we have concentrated the manual control of the automatic pilot in a single steering lever which is normally central when the rudder is central, or when the ship is steering a straight line on course, and which may be used at will for any one of several purposes, by positioning the same lever at different angular elevations. In the lowermost or horizontal position, the lever is used to turn the rudder directly without interference from the automatic pilot, by moving the lever from side to side in proportion to the rudder angle change or helm desired. This position is referred to as the "hand electric" control, since the rudder is then electrically controlled by the hand lever through the same electrically controlled steering engine as is used when the automatic pilot is effective. In the second or intermediate position, the automatic pilot system is brought into operation, but it is still possible to make small permanent course changes through the automatic pilot by a separate course trim knob on the steering stand by which the course may be changed in small increments, such as half a degree. In the third or uppermost position, larger course changes may be readily effected but without wholly disconnecting or disabling the automatic pilot, so that when the course change has been made the lever is released and the automatic pilot will then keep the ship on the new course without further adjustment on the part of the helmsman.

It should be noted that in at least two of the three positions the lever is moved from side to side to cause turning of the ship, just as the river pilots are in the habit of moving their steering levers on the river towboats. By our invention, we have also simplified and improved automatic pilots for general use by reducing the cost of same, improving performance and reducing the number of parts.

Referring to the drawings in which a preferred form of the invention is shown:

Figure 1:
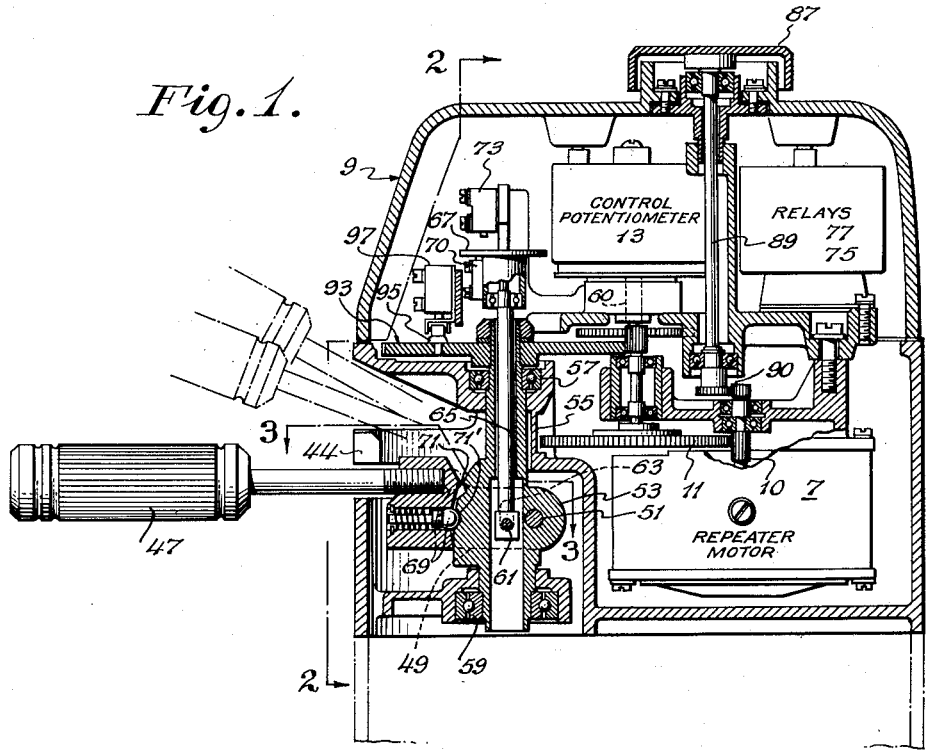
Fig. 1 is a vertical section of the top portion of the steering stand for our improved river pilot.
Figure 2:
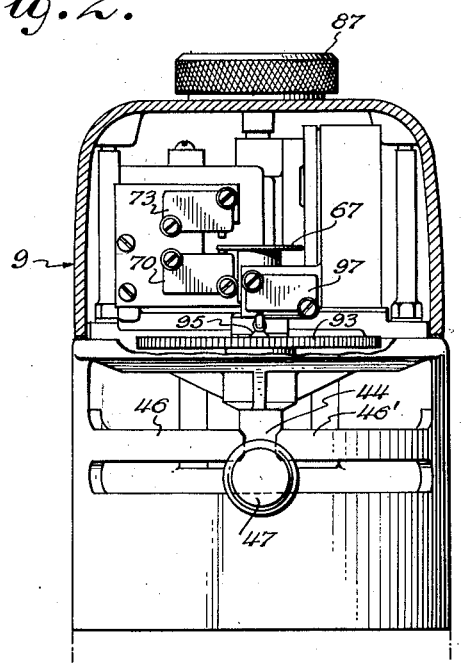
Fig. 2 is a vertical section taken approximately on broken line 2—2 in Fig. 1.
Figure 3:
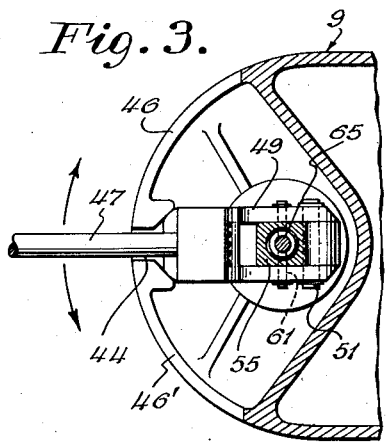
Fig. 3 is a horizontal partial section taken approximately on line 3—3 in Fig. 1.
Figure 4:
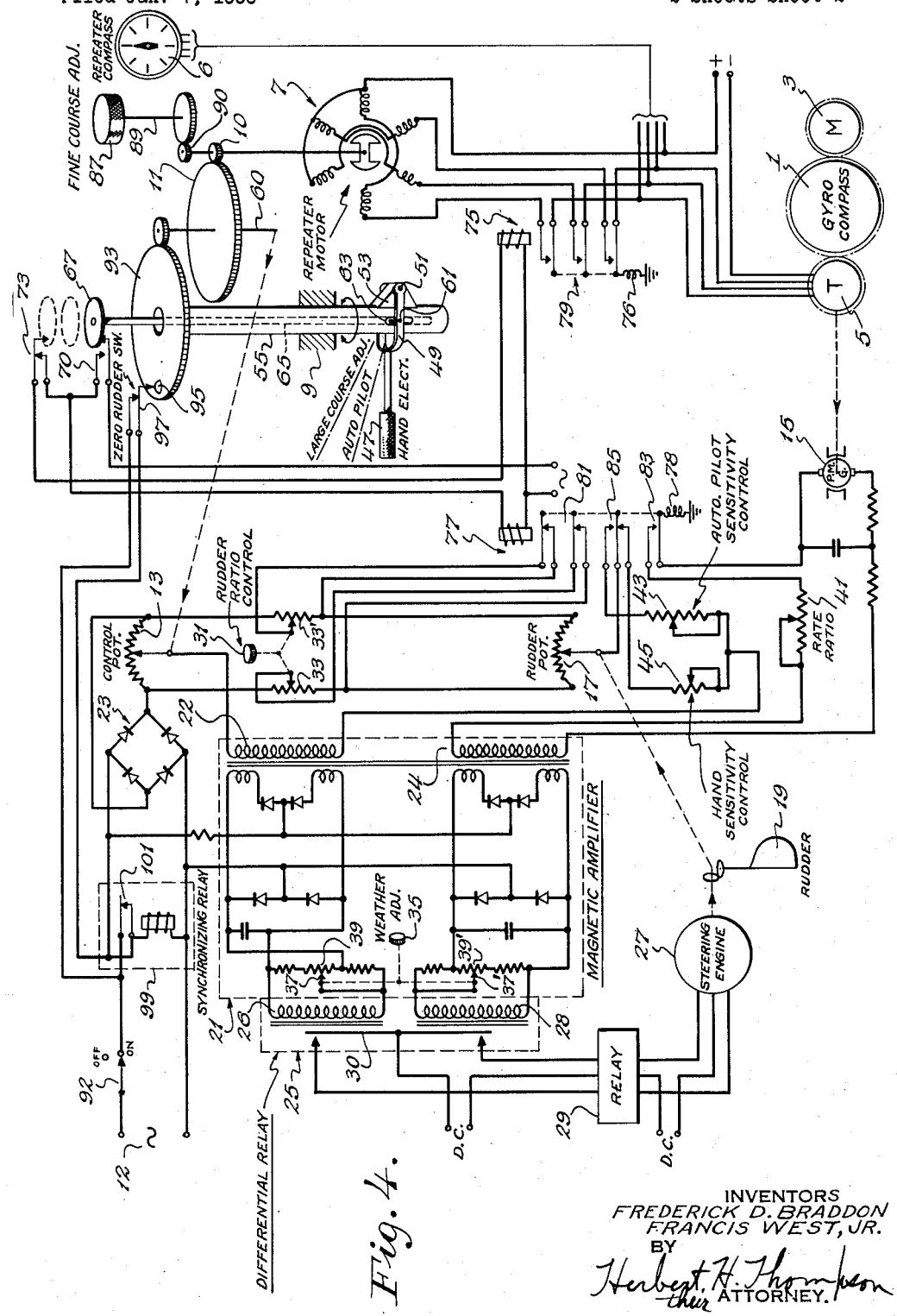
Fig. 4 is a simplified wiring diagram of our invention.

Referring first to Fig. 4, the basic instrument in any automatic pilot system is, of course, a compass, preferably a gyro-compass 1, having the usual azimuth motor 3 for rotating the phantom or follow-up ring and a transmitter 5 turned thereby, which transmits the readings of the compass to a repeater motor 7 in the steering or control stand 9 (Fig. 1). For our improved river pilot, we prefer to employ as the transmitter and repeater, a D. C. step-by-step system, such as shown in the patent to Sperry No. 1,403,062. In our system, the repeater motor is geared down through substantial reduction gearing 10, 11 to the course control potentiometer 13, the repeater motor making 180 revolutions per complete turn of the ship. Such repeater motors usually have 12 separate steps per revolution but have two positions of rest each revolution, so that each half turn of the repeater represents one degree turn of the ship. We also derive from the gyro-compass follow-up system some form of speed generator 15, the output E. M. F. of which is directly proportional to the rate of turn of the ship. Generator 15 is shown as a P. M. (permanent magnetic) D. C. generator. The gyro-compass transmitter 5 is also shown as actuating a repeater compass 6 which may be placed near the steering stand but is not a part of our improved river automatic pilot.

To apportion the rudder throw to the magnitude of the signal generated by potentiometer 13, we provide a rudder potentiometer 17 to oppose the output of the potentiometer 13, the rudder potentiometer being positioned by the ship's rudder 19. The output of the control and rudder potentiometers is amplified in suitable amplifier 21, which is represented as a magnetic amplifier, the details of which do not concern this invention, and which has an alternating current supply 12. Such an amplifier is shown in the prior patent application to De Westfelt, Serial No. 70,958, filed January 14, 1949. A portion of the A. C. supply 12 is rectified at 23 and supplied across the potentiometers 13 and 17. The two potentiometers are connected in Wheatstone bridge fashion with the rudder ratio control potentiometers 33, 33', the hand sensitivity control potentiometer 45 or the automatic pilot sensitivity control potentiometer 43 (all described hereinafter) to one of the saturable reactors 22 of the magnetic amplifier 21, while the input to another saturable reactor 24 of the same is supplied from the rate generator 15 through the rate ratio adjusting potentiometer 41. Each reactor is provided with two output coils to which rectified alternating current is supplied from the supply and the output of one half of the magnetic amplifier is supplied to one coil 26 of relay 25 while the output of the second half is supplied to the other relay winding 28, said windings acting oppositely on pivoted armature 30 of differential direct current relay 25. The output of the relay operates the steering engine 27 through a second relay 29. Steering engine 27 may be either electric or an electrically controlled hydraulic steering unit of known type.

We prefer to provide several adjusting knobs on the pilot by which improved steering may be obtained. Under different loading conditions and speed, a different amount of rudder throw per degree deviation from a preselected heading is desirable to give the best control. For this purpose, we provide a rudder ratio control knob 31 which adjusts the above-mentioned potentiometers 33 and 33', shown as center tapped resistors placed in series between the control and rudder potentiometers. The position of the center taps is varied by adjusting the knob 31, thus varying the ratio between a given deviation from course and the amount of rudder displacement caused thereby. Another important adjustment is provided by knob 35 marked "Weather Adjustment," which is for the purpose of rendering the rudder servo less sensitive in rough weather to small continuous yaws of the ship. This adjustment is shown as comprising sliders 37, 37' operating over resistors 39, 39' across the output relay coils 26, 28 of relay 25 to lessen the amount of current going through the relay coils in rough weather to reduce its sensitivity and provide in effect a variable dead spot. The variable potentiometer 41 is placed in the output of the speed generator 15 to secure the proper relationship between the turn rate term or signal and the displacement term or signal as secured from the control potentiometer 13. Sensitivity control potentiometers 43 and 45 are also provided, the former for the automatic pilot system when in operation and the latter for hand electric operation. The sensitivity adjustments, as well as that of potentiometer 41, however, are made to suit the particular ship on which the device is mounted and are not ordinarily adjusted by the helmsmen as are knobs 35 and 31.

In general, the several adjustments are similar in function and construction to those described in the prior application of Francis West, Jr., one of the joint inventors herein, now Patent No. 2,719,502, Automatic Pilot for Ships, dated October 4, 1955.

Our improved steering lever which replaces the usual hand or steering wheel on an automatic pilot is shown at 47, Figs. 1 and 4. This lever is normally centralized and is moved right or left for turning the rudder, but it has a plurality of angular positions in elevation by which it may be used for several different purposes. This lever is shown as secured to a forked bracket 49 pivoted at 51 on a boss 53 on a vertical sleeve 55, which is journalled in upper and lower bearings 57, 59 in the steering stand so that when the lever is turned sideways, this sleeve will be rotated with it. On said sleeve is mounted a gear 93, which is geared to the shaft 60 of control potentiometer 13. Bracket 49 is further provided with an inwardly extending pin 61, which passes through vertical slots 63 in the sleeve 55 and engages the shaft 65 within said sleeve. When the handle 47 is lifted, therefore, it will raise the shaft 65 carrying with it a contact controlling disc 67.

Three positions in inclination are shown for the handle 47, a spring pressed detent 69 being provided to hold the handle in each of its two lower positions in cooperation with the notches 71' and 71 in the sleeve 55. In the lowermost or normally horizontal position of the handle, the disc 67 is in the position shown in Fig. 1, in which the contact 70 is held open while 73 is closed. In the intermediate position of the handle, detent 69 is centered in notch 71, and the disc 67 is in the first dotted position of Fig. 4. In this position, contact 70 is closed and the upper contact 73 remains closed. In the upper position, however, detent 69 engages the upper lip of notch 71, and contact 73 is open leaving the contacts 70 closed.

These two contacts are connected in circuit with relays 75 and 77 so that in the lowermost position of the handle, which is the position shown in the drawings for a hand electric steering (with the power on) both relays 75 and 77 are deenergized, the relay 75 permitting the biasing spring 76 to break the electrical connections between the transmitter 5 and the repeater motor 7 by means of the three-relay contacts 79, so that repeater motor at that time is deenergized and will interpose no load resisting the movement steering handle 47. The relay 77 on the other hand permits the spring 78 at this time to short out the rudder ratio potentiometers 33, 33' and to disconnect the rate of turn generator 15 by means of the upper and lower contactors 81 and 83 of the relay. The middle contactor 85 at this time disconnects the automatic pilot sensitivity potentiometer 43 and connects in the circuit the hand sensitivity controller 45. Therefore, when steering by hand electric control, the rudder is entirely under control of the handle 47 and the automatic pilot system and all its special adjustments are ineffective including the rate of turn control supplied by speed generator 15, the rudder ratio adjustment and the gyropilot sensitivity adjustment. It should be noted, however, that no clutch or differentials are provided, as in prior systems, to throw the automatic pilot in and out, but the repeater motor 7 is left physically connected to the control potentiometer 13 at all times. However, it is deenergized during hand electric operation so as not to oppose movement of handle or lever 47.

In the central or automatic pilot position, contacts 70 and 73 are both closed so contacts 79 are made to energize the repeater motor 7 from transmitter 5 and thereby orient the control potentiometer directly. In this position, also relay contact 81 is opened to render the rudder ratio potentiometers 33 and 33' operative. Contact 83 is then closed to reconnect the rate of turn generator 15, which was rendered inoperative in the hand-electric position of lever 47, while switch 85 reconnects the automatic pilot sensitivity control potentiometer 43 and disconnects the hand sensitivity control potentiometer 45.

It should be noted that in order to raise the lever 47 from its lowermost to its intermediate or upper position, the lever must first be centralized in order that the shaft thereof can pass up through the narrow slot 44 between two projections 46, 46' from opposite sides of the stand. Thus, by this means, we prevent the helmsmen from putting the automatic pilot into operation unless the handle 47 is centralized, that is unless the rudder is in the mid position, since in the hand-electric or lower position, the lateral position of the handle is indicative of the rudder position and in fact the mechanism is preferably so designed that each degree movement of the handle represents a half degree movement of the rudder.

For the purpose of providing a small course adjustment at this time, we provide an auxiliary or course trim knob 87 which is shown as mounted at the top of the stand on a shaft 89 which is geared to rotate through step-up gearing 90 both the repeater motor 7 and the intermediate reduction gear 11, the shaft 60 of which turns the potentiometer 13. This knob is used while the repeater motor is left energized for making small course adjustments of a few degrees, and in spite of the fact that turning of the knob will be resisted by the repeater motor and will be felt by the user of the knob as steps equal to half a turn of the armature of the repeater motor which represents a one degree course change. Preferably we employ a 2½ to 1 step-up gearing at 90 and 10, so that each ⅕ of a turn of the knob is felt and represents a course change of one degree. If, therefore, the helmsman desires to change his course, say five degrees, he turns the knob until he feels five steps or notches, which will represent a five degree turn of the ship and 2½ revolutions of the repeater motor armature. While a course change when the automatic pilot is in operation could theoretically be secured by moving the hand lever 47 from its intermediate position, this is not the preferred method of making course changes since the hand lever is virtually locked against manual adjustment at this time by the opposition of the energized repeater motor acting through double step-up gearings 10, 11, 93.

We do provide a means, however, for making large course changes without entirely disconnecting the pilot. For this purpose, we move the hand lever into the temporary or uppermost position which deenergizes coil 75 only and thus breaks the circuit to the repeater motor to remove its load but leaves relay coil 77 energized because contact 70 is closed and therefore the rudder ratio control, the rate of turn signal and the automatic pilot sensitivity adjustment remain operative. It may be noted that no notch is provided for the handle 47 in its uppermost position, so that the moment the helmsman lets go of the handle, it snaps back to the middle position (in inclination) under the influence of the spring pressed ball or detent 69 and the weight of the handle 47, thereby restoring immediately full automatic pilot operation (see Fig. 4). If the handle is not centralized when so released, the automatic pilot will bring the ship to the new course indicated by the off center position of the handle, thereby restoring the handle to its central position, as the ship comes around to its new course.

In order to prevent sudden application of the rudder when the steering system is initially brought into operation by closing of main supply switch 92, we provide a synchronizing contact 97 operated by button 95 on large gear 93, which is connected to the sleeve 55 and which is also turned from reduction gearing 11 driven by repeater motor 7. This contact is open unless the gear 93 is in the position in which the button 95 raises the contactor 97. In all other positions, this contact is open. This button is only in the contact closing position if lever 47 is in the hand electric position when the rudder is centralized, i. e., when the lever is in the amidship position. If the lever is in the mid or automatic pilot position, the contact will not be closed until the ship is on the course called for by the automatic pilot, which is only true when the lever is amidship. Therefore, the helmsman must centralize the lever before any circuits can be energized. Contact 97 is shown as controlling the synchronizing or holding relay 99 so that once the coil 99 is excited, it will hold contact 101 closed until the main supply switch 92 is again opened, when contact 101 opens and the autopilot cannot be brought into play until contact 97 is again closed.

From the foregoing, the operation of our invention and its advantages for use in radar directed steering in restricted waters should be obvious. With the radar scope positioned adjacent our novel steering stand, the pilot need not blind himself by looking alternately at the radar screen and at his compass in a bright fog, since he can keep his head under the hood and steer entirely from the simple steering lever 47. He can first bring his ship to the desired radar course with lever 47 in its lowermost position, and he may then raise it to its intermediate position which will throw it on the automatic pilot and hold that course. If the scope shows that the course should be altered slightly, he turns the trim knob 87 a notch or two, leaving the automatic pilot in control, or he can raise lever 47 to the uppermost position and make the course change, after which he releases it again reestablishing automatic control. We are aware that it has been proposed to combine on one screen both the radar indications and the ship's heading indication, but, by our invention, this becomes an unnecessary complication, since the pilot has the advantage of automatic course maintenance through his automatic pilot and observation of the compass heading becomes unnecessary, especially if the scope is stabilized in azimuth from the gyro-compass as shown in the prior application of Omar B. Whitaker, Serial No. 42,807, filed August 6, 1948, for Combined P. P. I. Presentation. In other words, it has been found that steering alone by radar scope is unsatisfactory, since the radar scope is not sufficiently accurate or reliable to maintain a course unassisted by a base line such as the gyro-compass, which result is best accomplished by an automatic pilot operated from a gyro-compass, as is done by the present invention.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an automatic pilot for ships having a compass governed controller, and a rudder motor controlled thereby, a compass repeater motor geared to said controller, a steering lever having a plurality of positions in a substantially vertical plane and also movable laterally right and left from normal in each of said positions, a means operated from said lever for deenergizing said repeater motor when said lever is in at least one of said first defined positions, said lever being connected to said controller to displace the same by said lateral movements, thereby causing proportional rudder displacement when said lever is in said one of said first defined positions, but said repeater motor preventing manual movement of said lever in another of said first defined positions.

2. An automatic pilot as claimed in claim 1 also having a rudder follow back controller, the output of which opposes the output of the first controller, a rudder ratio adjustment between said controllers, and means for rendering said adjustment inoperative when the lever is in said one of said first defined vertical positions.

3. An automatic pilot as claimed in claim 2 in which said lever in the third or uppermost of its plural positions may be used to change course and in which position said rudder ratio adjustment remains in circuit, and a switch operated by raising said lever to said third position for deenergizing only said repeater motor, whereby course changes may be effected by laterally displacing said lever when in said third position.

4. An automatic pilot as claimed in claim 1, also having a rate of turn signal for opposing the signal from said controller and means for cutting out said rate signal when the lever is in said one of said first positions in the vertical plane.

5. An automatic pilot as claimed in claim 4, in which said lever in the third or uppermost of its plural positions in a vertical plane may be used to change course and in which position said rate signal remains effective, and a switch operated by raising said lever to said third position for deenergizing only said repeater motor.

6. A steering stand for ships having an electrical controller therein for governing the rudder servomotor, a steering handle or lever rotatably mounted in said stand for rotation in inclination, and laterally in both directions from the amidship's position, means connecting said lever and said controller for moving the latter upon lateral rotation of the lever in several of its positions in inclination, a compass controlled repeater motor for automatic pilot operation, means for rendering said motor operative to actuate said controller upon said lever being moved to an inclined position, and means for preventing said lever from being moved from one of its positions in inclination to another, except when the lever is amidship, whereby automatic steering cannot be rendered effective unless the ship is approximately on its desired course.

7. A steering stand for ships having an electrical controller therein for governing the rudder servomotor, a steering handle or lever rotatably mounted therein for movement both in inclination and laterally in both directions from the amidship's position, means connecting said lever and said controller for moving the latter upon lateral movement of the lever in several of its positions, a normally deenergized compass repeater motor also connected to said controller, whereby manual control may be effected by moving said lever laterally without interference from said motor, and means operated by changing the position in inclination of said lever for energizing said motor whereby the ship may be steered automatically.

8. A steering stand for ships having an electrical controller therein for governing the rudder servomotor, a steering handle or lever rotatably mounted therein for movement both in inclination and laterally in both directions from the amidship's position, means connecting said lever and said controller for moving the latter upon lateral movement of the lever in several of its positions in inclination, a normally deenergized compass repeater motor also connected to said controller, means operated by changing position inclination of said lever for energizing said motor whereby the ship may be steered automatically at will, and means for preventing said lever from being moved from one of its inclined positions in inclination to another, except when the lever is amidships.

9. An electrically operated steerer for ships having a manually operable controller for controlling the rudder, and a main switch for energizing and deenergizing said steerer, an interlocking device for preventing energization of said steerer when said main switch is closed until the rudder is centralized including a normally open holding switch in series with said main switch and having a holding coil, a second normally open switch in circuit with said coil to energize the same, and means for closing the second switch only when said rudder is centralized, whereby once the main switch is closed and the rudder is centralized, the steerer becomes and remains operative until said main switch is opened.

10. An automatic pilot for ships as claimed in claim 1, also having an auxiliary or course trim knob, said knob being connected to said repeater motor, whereby by turning the knob, the repeater motor may be overpowered and the course changed in proportion to the amount that the knob is turned.

11. An automatic pilot as claimed in claim 10, in which said repeater motor is of the step-by-step type, whereby when the pilot turns the knob he feels the steps and may hence change course in predetermined increments without looking at the controller.

12. An electric automatic pilot for ships including a compass governed controller, a rudder motor controlled thereby, a step-by-step repeater motor permanently geared to said controller, a steering lever having a plurality of positions in inclination for hand-electric and automatic pilot operation and also movable laterally right and left for operating said controller, means also operated by said lever for deenergizing said repeater motor when in the hand-electric position, and auxiliary means for changing course when steering automatically comprising a knob connected to said repeater motor whereby by turning the knob the repeater motor may be overpowered and the course changed in increments.

13. An improved steering stand for automatic pilots having a gyro-compass and adapted for direct manual operation by a helmsman or joint automatic and hand operation, both without actual observation, including a pivoted steering lever movable right and left and normally positioned fore and aft, an electrical controller positioned by said lever, a rudder motor governed by said controller, a follow-back controller moved by said rudder and also governing the same, whereby the rudder occupies a position corresponding to the lever position, means also pivoting said lever for movement in elevation, and means operative by raising said lever for also controlling said controller from said gyro compass, and other rotatable manual means connected to said motor for overpowering said motor when said lever is in said elevated position to effect course changes through the automatic pilot.

14. A steering stand for ships having an electrical controller therein for governing the steering engine, a pivoted steering member movable laterally in a first plane in either direction from amidship's position and permanently connected to said controller for effecting course changes solely by the helmsman, a normally deenergized compass repeater motor also connected to said controller, means mounting said lever for such lateral movement in a second plane, and means operated by shifting said lever to said second plane for energizing said repeater motor whereby the ship may then be steered automatically and manual course changes from said lever ordinarily prevented.

15. A steering stand for ships as claimed in claim 14, also having normally inoperative special adjustments between said repeater motor and said servo to adapt the device for automatic steering, and means also operated by shifting said lever to said second plane for energizing said repeater motor and bringing into operation said special adjustments.

16. A steering stand for ships as claimed in claim 15, also having means mounting said lever for such movement in a third plane, and means operated by shifting said lever to said third position for again deenergizing said repeater motor but leaving in operation said special adjustments.

17. A steering stand for ships as claimed in claim 16, in which reduction gearing is employed between said repeater motor and lever such as to lock the hand lever against hand movement when said repeater motor is energized and also having an auxiliary course change knob more directly connected to the repeater motor whereby small course changes may be effected while the ship is being steered automatically.

18. A steering stand for ships as claimed in claim 17, wherein said repeater motor is of the step-by-step type whereby course changes may be effected through said auxiliary means in predetermined small steps which are felt by the helmsman in operating said means.

19. An automatic pilot for ships having a compass governed controller, a rudder motor controlled thereby, a compass repeater motor permanently geared to said controller through reduction gearing, and means for changing course a predetermined number of degrees without looking at the compass card and without deenergizing said motor, including a course change knob also geared to said repeater motor and controlled through reduction gearing bearing a known ratio to said other gearing and sufficiently high to enable said motor to be overpowered, whereby a course change may be effected by turning said knob through an angle such as to displace the repeater motor armature beyond its position of self-synchronism a predetermined number of times whereby a change of heading of a predetermined number of degrees may be made through an equal number of small, finite successive steps, each of which may be felt by the pilot in moving the course change knob.

20. An automatic pilot for ships as claimed in claim 19, in which the gear ratios are such that ⅕ of a turn of the knob represents a course change of one degree.

References Cited in the file of this patent

UNITED STATES PATENTS

| | | |
|---|---|---|
| 1,725,600 | Sperry | Aug. 20, 1929 |
| 2,221,311 | Hodgman | Nov. 12, 1940 |
| 2,446,173 | Ekblom | Aug. 3, 1948 |
| 2,452,311 | Markusen | Oct. 26, 1948 |
| 2,464,629 | Young | Mar. 15, 1949 |
| 2,618,771 | Stanley et al. | Nov. 18, 1952 |
| 2,627,384 | Esval | Feb. 3, 1953 |

OTHER REFERENCES

"Electronics," October 1945, pp. 98–101.